United States Patent
Strelioff et al.

(10) Patent No.: US 8,843,283 B2
(45) Date of Patent: Sep. 23, 2014

(54) HEIGHT CONTROL

(71) Applicant: NORAC Systems International Inc., Saskatoon (CA)

(72) Inventors: William Strelioff, Saskatoon (CA); Jason Griffith, Saskatoon (CA); James Schnaider, Warman (CA); Gordon Lee, Saskatoon (CA); Dean Hockley, Saskatoon (CA)

(73) Assignee: Norac Systems International Inc., Saskatoon (CA)

( * ) Notice: Subject to any disclaimer, the term of this patent is extended or adjusted under 35 U.S.C. 154(b) by 185 days.

(21) Appl. No.: 13/625,189

(22) Filed: Sep. 24, 2012

(65) Prior Publication Data

US 2013/0345937 A1    Dec. 26, 2013

(30) Foreign Application Priority Data

Jun. 26, 2012   (EP) ...................................... 12173531

(51) Int. Cl.
   *G06F 7/70*    (2006.01)
   *A01D 41/14*   (2006.01)
   *A01M 7/00*    (2006.01)

(52) U.S. Cl.
   CPC ............ *A01D 41/141* (2013.01); *A01D 41/145* (2013.01); *A01M 7/0057* (2013.01)
   USPC .................... 701/50; 172/4.5; 172/9; 342/123

(58) Field of Classification Search
   CPC . A01M 7/0057; A01D 41/141; A01D 41/145; A01D 41/127; A01D 41/06
   USPC ............ 701/50; 172/4.5, 9; 342/123; 367/99; 460/114; 56/208
   See application file for complete search history.

(56) References Cited

U.S. PATENT DOCUMENTS

| | | | |
|---|---|---|---|
| 6,959,527 B2 * | 11/2005 | De Mendonça Fava et al. | 56/10.2 R |
| 2003/0184747 A1 | 10/2003 | Diekhans et al. | 356/300 |
| 2004/0129798 A1 | 7/2004 | McCrea et al. | 239/166 |

FOREIGN PATENT DOCUMENTS

| | | |
|---|---|---|
| AU | 5387473 | 10/1974 |
| EP | 1978433 | 10/2008 |

OTHER PUBLICATIONS

Communication for the corresponding European application No. 12173531.0 dated Nov. 15, 2012.

* cited by examiner

*Primary Examiner* — Gertrude Arthur Jeanglaude

(74) *Attorney, Agent, or Firm* — Westman, Champlin & Koehler, P.A.

(57) ABSTRACT

A method and apparatus for controlling a height of an agricultural equipment component is provided. An average crop height is determined. In one embodiment, the agricultural equipment component is controlled to maintain a predetermined distance from a current top of crop level. If a current top of crop level cannot be determined, a virtual top of crop level is calculated using the average crop height value. The agricultural equipment component is controlled to maintain a predetermined distance from the virtual top of crop level. In another embodiment, the agricultural equipment component is controlled to maintain a predetermined distance from current ground level. If a current ground level cannot be determined, a virtual ground level is calculated using the average crop height value. The agricultural equipment component is controlled to maintain a predetermined distance from said virtual ground level. An ultrasonic sensor is also provided.

24 Claims, 10 Drawing Sheets

FRONT VIEW

HEIGHT CONTROL

FIELD OF THE INVENTION

This invention relates to a system and method for controlling the height of agricultural equipment components.

BACKGROUND OF THE INVENTION

In agriculture, trailed or self propelled units such as sprayers, have booms which are towed behind tractors and are controlled to deliver insecticides and the like to crops through which the tractor drives. Sprayer boom height is typically dynamically positioned in order to maintain a fixed distance between the boom and the crop or soil. Booms are typically rotatable about an axis parallel to the longitudinal axis of the tractor so that they can rotate and remain substantially parallel to the crop even if the tractor drives over sloped ground. Precise control over the height of the boom on which the sprayer nozzles are mounted with respect to the crop is required to avoid damage to the crop by the boom itself as well as to ensure even and proper application of the sprayed chemicals to the crop. The height control of the boom above the crop can be manually or automatically controlled in a number of ways, some of which include the use of ultrasonic distance measuring to determine the height of the boom above the crop. Similarly, in agricultural harvesting operations, cutting blades on a cutter bar must be maintained at a certain height relative to the top of the crop or to the ground level so that crop is harvested accurately even if the crop height or ground level changes with respect to the cutting blades.

In ultrasonic distance measuring, ultrasonic signals are emitted from a transducer and the reflected echoes or return signals from objects in the path of the ultrasonic pulse are detected, after a time interval, by the transducer. The elapsed time between the transmission of the pulse and the receiving of a return pulse reflected off of an object (i.e. an echo) can then be used to calculate the distance to the objects causing each reflected return.

Because it is imperative that the sprayer boom does not come into contact with the top of the crop as the boom is being towed behind the tractor, or that cutting blades do not cut too high or low on a crop, height control systems which use ultrasonic distance measuring have one or more ultrasonic sensors arranged on the sprayer boom or cutter bar which attempt to detect the distance between the boom or cutter bar and some reference datum by listening for the echoes which bounce back to the transducer after the pulse is transmitted.

Using the well known relationship between speed, distance and time, calculating the distance which the ultrasonic sound pulse has travelled before being reflected by objects in the path of the pulse is simple and thus the distance between the boom or cutter bar and a feature causing a reflection can be determined. Once the distance between the boom or cutter bar and a reference datum is known, the sprayer boom or cutter bar can be moved up or down automatically to maintain a predetermined separation distance between the sprayer boom or cutter bar and the reference datum (typically either the top of the crop or the ground level).

Controlling a sprayer boom so that it maintains a fixed distance from the top of the crop can result in a situation in which, in the absence of crops under the sprayer boom, the control system will interpret a reflection of the ultrasonic pulse from the ground under the sensor to be a reflection representative of the top of the non-existent crop because it is the first echo received. If the sprayer boom is being controlled such that a fixed separation between the top of the crop and the sprayer boom is being maintained then this erroneous interpretation of the reflection from the soil as a top of crop signal will cause the sprayer boom to be lowered to maintain the predetermined separation. However, the separation in this case would be between the sprayer boom and the ground level which has been erroneously interpreted as corresponding to the top of the crop.

This temporary absence of the crop in the transmission path of the ultrasonic sensor will result in the sprayer boom being lowered much further than would be the case if a true reflection had been received from the top of the crop. In some cases, the sprayer boom may be lowered to such an extent that part of it contacts the ground. In any case, it is likely the boom will have been lowered below the true level of the top of the crop and thus a collision between the boom and the approaching crop may occur.

If height control with respect to the local ground level is being carried out, such as in the example of a harvester cutter bar, then situations can arise in which a reliable ground level cannot be determined or where, due to either matter resting on the ground or vegetation and the like being present under the sensors, an erroneous ground level is determined. In the first case, a ground level controlled system can become inoperable if it cannot determine a reliable ground level. In the second case in which a ground level is determined which is not the true ground level then the sprayer boom/cutter bar can again be raised or lowered when it should not be.

Clearly, alternative systems and methods of controlling the height of a sprayer boom/cutter bar are required which do not suffer from these problems.

SUMMARY OF THE INVENTION

A method and apparatus for controlling a height of an agricultural equipment component is provided. An average crop height is determined. In one embodiment, the agricultural equipment component is controlled to maintain a predetermined distance from a current top of crop level. If a current top of crop level cannot be determined, a virtual top of crop level is calculated using the average crop height value. The agricultural equipment component is controlled to maintain a predetermined distance from the virtual top of crop level. In another embodiment, the agricultural equipment component is controlled to maintain a predetermined distance from current ground level. If a current ground level cannot be determined, a virtual ground level is calculated using the average crop height value. The agricultural equipment component is controlled to maintain a predetermined distance from said virtual ground level. An ultrasonic sensor is also provided.

BRIEF DESCRIPTION OF THE DRAWINGS

Embodiments of the invention will now be described, by way of example only, with reference to the attached drawings, in which:

FIG. 5b is a representative plot showing an interpretation of the signal illustrated in FIG. 5a;

DETAILED DESCRIPTION

Figure 1:
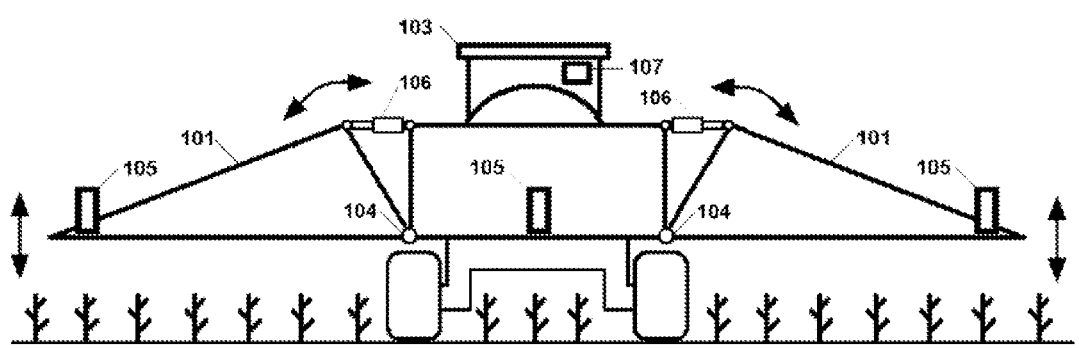
FIG. 1 illustrates an arrangement of an example sprayer boom height control system in accordance with an embodiment of the present invention.

FIG. 1 shows a tractor unit 103 having variable geometry (VG) sprayer booms 101 arranged on each side of the tractor unit and which are used with and controlled by a control system and method of the present invention. Each of the two VG sprayer booms 101 is mounted to the tractor unit 103 at an end thereof via a well known coupling mechanism such as a hydraulic ram 106 and a pivot 104. The coupling mechanism allows each VG sprayer boom 101 to be tilted (as shown by the arrows in FIG. 1) with respect to the tractor and also to rotate clockwise and anticlockwise about its mounting point with the tractor unit 103. Three ultrasonic sensor modules 105 are mounted on each of the VG sprayer booms 101 in positions in which they are able to project a pulse of ultrasound in a downwards facing cone towards the area directly underneath the VG sprayer boom on which it is mounted. In the preferred embodiment, the ultrasonic sensor modules 105 are mounted on, but in front of, the boom so that they are at the leading edge of the boom. The skilled person will appreciate that mounting the ultrasonic sensors in this way means that they will pass over the crop before the boom itself as the tractor moves forward through the crop. In the preferred embodiment, each ultrasonic sensor module 105 is a NORAC UC5 ultrasonic sensor (NORAC part #43750).

Figure 2:
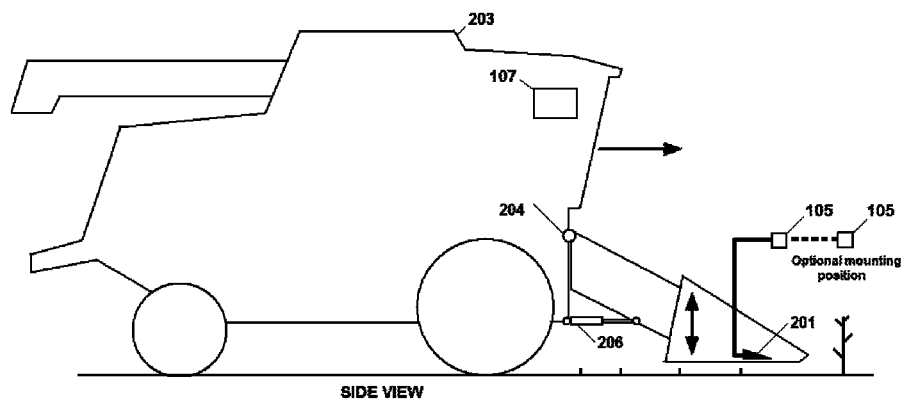
FIG. 2 illustrates an arrangement of an example cutter bar height control system in accordance with an embodiment of the present invention.

FIG. 2 shows a harvester unit 203 having a cutter bar 201 arranged on the front of the machine which is used with a control system and method of the present invention. The cutter bar 201 is mounted to the harvester unit 203 by a well known coupling mechanism such as a hydraulic ram 206 and a pivot 204. The coupling mechanism allows the cutter bar to be raised or lowered with respect to the ground. In this example two ultrasonic sensors 105 are mounted to each side of the cutter bar, in front of the leading edge of the cutter bar, but other numbers of sensors may also be appropriate. The skilled person will appreciate that mounting the ultrasonic sensors in this way will mean they pass over the crop and ground before the cutter bar itself as the harvester moves through the crop. In the preferred embodiment, each ultrasonic sensor module 105 is a NORAC UC5 ultrasonic sensor (NORAC part #43750).

Figure 3:
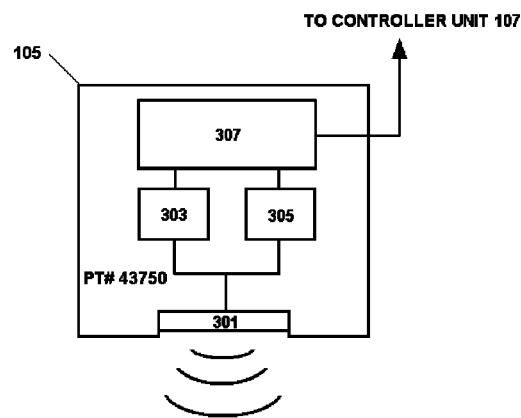
FIG. 3 illustrates the arrangement of one of the ultrasonic sensor modules of the system depicted in FIG. 1, in more detail.

FIG. 3 shows an ultrasonic sensor module 105 in greater detail. Each individual ultrasonic sensor module 105 consists of an ultrasonic transducer 301, operable to transmit and receive ultrasonic sound waves, connected to a pulse generator 303 which generates the ultrasonic pulse from a source voltage supplied from the electrical system (not shown) to which the ultrasonic sensor modules 105 are connected. The ultrasonic transducer 301 within the ultrasonic sensor module 105 is also connected to a receiving and amplifying circuit 305 inside the ultrasonic sensor module 105 and which converts ultrasonic sound waves received at the transducer into electrical signals as will be described in more detail below. Each ultrasonic sensor module 105 also includes a control circuit 307 connected in communication with each of the elements within the module 105 described above, and configured to control various aspects of the operation of the ultrasonic sensor module as will be described in more detail below. In the preferred embodiment of the present invention, the control circuit 307 is a microprocessor or CPU type device able to execute programmed instructions and either incorporates internal memory for data storage or is connected to an external memory device for data storage.

The control circuit 307 is connected to the controller unit 107 of the tractor unit thus allowing each ultrasonic sensor module 105 to communicate with the central controller unit 107. The connection between the ultrasonic sensor module 105 and the controller unit 107 may be by wired or wireless means. In the preferred embodiment, each of the ultrasonic sensor modules 105 and also the controller unit 107 are connected to the CAN (Controller Area Network) bus of the tractor unit 103 using appropriate connections and thus communication between the controller unit 107 and individual ones of the ultrasonic sensors is enabled. Communication between the controller unit 107 and each ultrasonic sensor 105 is based on the ISO 11783 communication protocol.

While embodiments of the present invention will generally be described with respect to one or more ultrasonic sensor modules 105 communicating with a central controller unit 107, those skilled in the art will appreciate that embodiments of the present invention can be practiced with a single ultrasonic sensor module. In such embodiments, control circuit 307 must include suitable memory and processing abilities to maintain a moving average function, as will be described in greater detail below.

Each moving part of the boom constitutes an individual control channel of controller 107. The combination of more than one sensor module 105 may be used for controlling an individual channel.

As discussed above, the ultrasonic sensor modules 105 are capable of transmitting ultrasonic pulses and detecting reflected ultrasonic signals corresponding to echoes of the originally transmitted pulse. The operation of such sensor modules 105 will be explained in more detail with reference to the type of signals which will typically be generated and received in the course of operation of embodiments of the present invention.

In operation, the ultrasonic transducer 301 of the ultrasonic sensor module 105 periodically transmits a pulse of ultrasound lasting a few microseconds. Ultrasonic frequencies are used in the preferred embodiment because the beginning and end of the resulting pulse is better defined at ultrasonic frequencies than at sonic frequencies meaning that the echoes (reflections of the transmitted pulse) which will be produced by objects in the path of the pulse will also be better defined and hence their detection will be more accurate. Additionally, by using ultrasonic frequencies rather than sonic frequencies, the ultrasonic sensor module 105 will not be as affected by ambient noise, which typically occurs at sonic frequencies much more than at ultrasonic frequencies, when receiving the reflected echoes of the transmitted ultrasound pulse.

The radiation pattern of the pulses from the ultrasonic transducer typically takes the form of an expanding cone centered on the transducer 301, the pulse spreading out in the radial direction as it moves away from the transducer 301 along the transmission axis. Each ultrasonic sensor module 105 operates in a "transmit and receive cycle" whereby the control circuit 307 within the ultrasonic sensor module first triggers the ultrasonic pulse generator 303 to the transducer 301 to produce an ultrasonic pulse in a manner well understood by the skilled person. Once the transducer 301 has transmitted its ultrasonic pulse, the control circuit 307 begins the "receive" part of the "transmit and receive cycle". This opens a receive window which defines a period of time during which echoes of the transmitted pulse are expected to be received by the transducer 301 and passed to the receiving and amplifying circuit 305. In the preferred embodiment, the control circuit may introduce a delay of approximately 1 millisecond after the ultrasonic pulse has been transmitted before measuring the received signal to allow any voltage spikes, present at the transducer caused by generating and transmitting the ultrasonic pulse, to subside.

Each ultrasonic pulse has a duration of approximately one millisecond. The receive window, which is opened after the ultrasonic pulse is transmitted, is approximately 10 milliseconds in duration which provides ample time for any reflections of the transmitted pulse to reach the transducer 301. In the preferred embodiment, ultrasonic pulses may be transmitted at discrete intervals of approximately 15 to 35 milliseconds.

While the receive window is open (i.e. whilst the amplifying circuit 305 is listening for echoes of the transmitted pulse), the control circuit 307 monitors the time that has elapsed since the pulse was transmitted. Any echoes collected at the transducer 301 are received and amplified by the amplifying circuit 305 and passed to the control circuit 307 where the signal parameters of the received echo are recorded. Recorded signal parameters include the time at which each reflection occurs and amplitude of the reflected signal as it changes over time.

In the preferred embodiment, during the receive window, the control circuit 307 automatically increases the signal gain of the receiving and amplifying circuit 305 in an exponential manner with increasing elapsed time from transmission of the pulse. This increasing of the receiver gain accounts for the fact that reflections received at increasing elapsed time since pulse transmission will have been reflected from objects further away from the ultrasonic sensor module 105 and hence will be weaker in amplitude than reflections caused by objects nearer to the ultrasonic sensor module 105 and which would naturally be received in a shorter time.

When a predetermined amount of time has elapsed from transmission of the ultrasonic pulse, the receive window is closed so that the transducer is then ready to transmit a further pulse after the appropriate time interval between pulses has elapsed.

Figure 4:
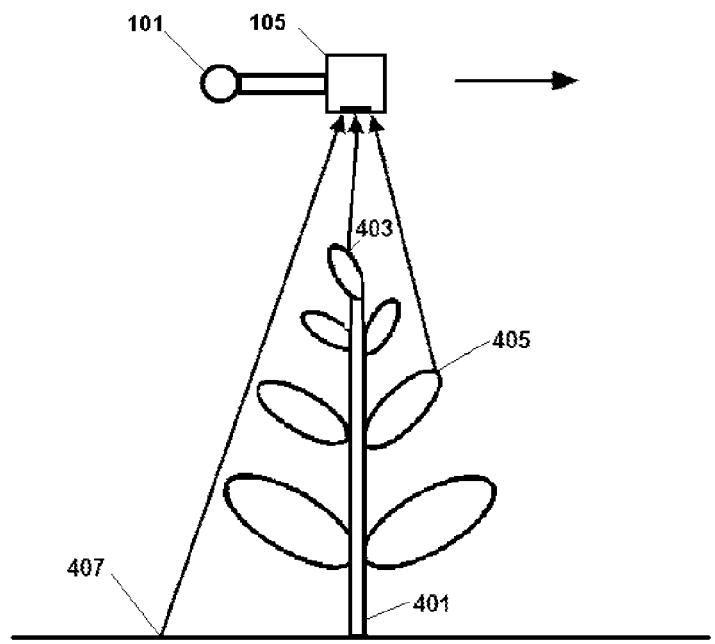
FIG. 4 illustrates the arrangement of part of the system depicted in FIG. 1, in more detail.
Figure 5A:
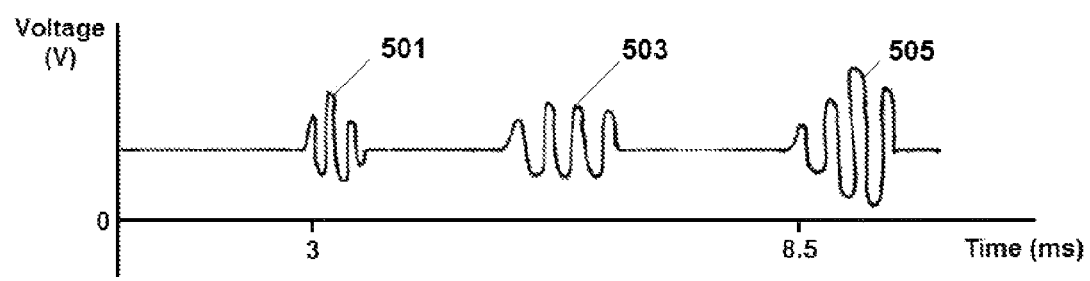
FIG. 5a is a representative plot showing a signal received by a sensor in the example, over time.

FIG. 4 illustrates an exemplary arrangement of a part of the VG boom 101, and ultrasonic sensor module 105 thereon, in relation to an individual crop component 401 to better illustrate how embodiments of the present invention operate. The view is side on to the direction of travel of the boom (indicated by the large arrow) and the ultrasonic sensor module 105 is shown, mounted ahead of the boom 101. FIG. 5a shows a representation of the echo or return signal which is typically generated by the ultrasonic transducer 301 and recorded by the control circuit 307 in its memory therein over the duration that the receive window is open following the transmission of an ultrasonic pulse and its reflection from the crop component 401 illustrated in FIG. 4. A number of peaks in the amplitude of the signal generated by the ultrasonic transducer 301 during the receive window can clearly be seen occurring at various times during the receive window at positions 501, 503, and 505. These peaks correspond to reflections of the ultrasonic pulse from the top 403 of the crop component 401, an intermediate part of the crop (such as a leaf or fruit) 405, and the ground 407 as shown in FIG. 4.

The control circuit 307 within the ultrasonic sensor module 105 analyzes the signal produced by the receiving and amplifying circuit 305 while the receive window is open and converts the time at which each peak of interest occurs to a corresponding distance from the transducer of the ultrasonic sensor module 105 (because the distance from the transducer 301 at which a reflection occurred is equal to half of the speed of the transmitted pulse multiplied by the time between the pulse being transmitted and the reflection being received). Because the speed of sound in air is dependent on the temperature of the air through which the sound wave is passing, for each transmit and receive cycle of the ultrasonic sensor module 105, the control circuit 307 measures the instantaneous local air temperature using appropriate means such as a thermistor and calculates a temperature adjusted speed for the ultrasonic pulse to be used in the distance conversion described above, to improve accuracy.

The control circuit 307 in the ultrasonic sensor module 105 carries out signal analysis on the signal generated by the receiving and amplifying circuit 305 to interpret the analog peaks occurring in the signal over time during the open receive window into discrete echoes originating from various distances from the transducer 301. To improve measurement accuracy the time measured to the leading-edge of the processed signal is used.

Figure 5B:
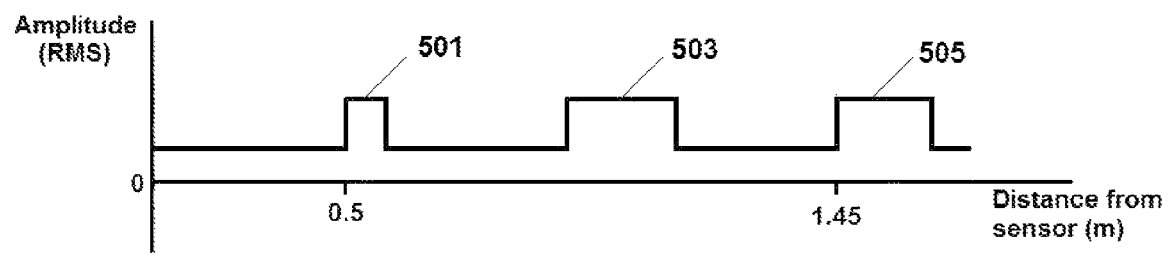

FIG. 5a illustrates the recorded signal and FIG. 5b illustrates how the signal can be interpreted. In FIG. 5a, the first peaks 501 in the signal generated by the receiving and amplifying circuit 305 occurred at approximately 3 milliseconds elapsed time after the pulse was transmitted. The peaks at 501 correspond to the reflection of the transmitted pulse by the top section 403 of the crop component 401 and are obviously the first reflections to be received by the ultrasonic sensor module 105 during the receive window because the top of the crop is closest to the transducer 301. Converting the elapsed time into distance as described previously allows the control circuit 307 to determine that the first reflections occurred at a distance of approximately 0.5 m from the transducer of the ultrasonic sensor module 105 in this example. Similarly, the last reflections, corresponding to peak 505 were received after approximately 8.5 milliseconds had elapsed since the pulse was transmitted. This corresponds to a distance of approximately 1.45 m from the transducer of the ultrasonic sensor module 105.

The control circuit 307 in the ultrasonic sensor module 105 assumes that the peak 501 occurring closest to the transducer corresponds to a reflection of the ultrasonic pulse by the top of the crop 401 and thus that the top of the crop is approximately 0.5 m from the level of the transducer of the ultrasonic sensor module. Because the transducer 301, in its ultrasonic sensor module 105, is rigidly mounted to the boom 101, the distances measured to the level of the transducer 301 can be interpreted to give a distance from the boom. If the bottom of the boom 101 and the transducer 301 are at the same height, as is the case in the preferred embodiment, then any distance determined relative to the transducer is also the distance relative to the boom. In a similar manner, the control circuit 307 is able to assume that the peak 505 occurring furthest from the transducer 301 corresponds to a reflection of the ultrasonic pulse from the ground and thus the ground is approximately 1.45 m from the transducer of the ultrasonic sensor module 105.

The control circuit 307 and memory in the ultrasonic sensor module 105 store the top of crop distance value generated over one or more previous transmit and receive cycles (in the preferred embodiment previous top of crop distance values recorded over the previous 70-100 milliseconds of operation are stored) and calculates a moving average for the previously recorded top of crop distance. For the current transmit and receive cycle, the control circuit 307 then compares the distance which it has currently determined for the top of crop to the moving average value of the previously recorded distances for the top of the crop ascertained over previous cycles. If the top of crop distance determined by the ultrasonic sensor module 105 for the current cycle is within a predetermined deviation from the moving average value determined from the previous cycles stored in the memory then the ultrasonic sensor module outputs to the controller 107 the value it has determined as the distance of the top of the crop from the transducer of the ultrasonic sensor module. If the top of crop distance determined by the ultrasonic sensor module 105 for the current cycle is not within the acceptable deviation from the moving average distance value determined from the previous cycles then the ultrasonic sensor module 105 outputs to the controller 107 a "no reading" error value for the top of the crop distance value.

In a similar manner, the control circuit in the ultrasonic sensor module 105 stores the ground distance value generated over one or more previous transmit and receive cycles (in the preferred embodiment previous ground distance values recorded over the previous 70-100 milliseconds of operation are stored) and calculates a moving average for the previously recorded ground distance. For the current transmit and receive cycle, the control circuit 107 compares the distance which it determines for the ground distance in the present cycle to the moving average value of the previously recorded distances for the ground level. If the ground distance determined by the ultrasonic sensor module 105 for the current cycle is within a predetermined deviation from the moving average value determined from the previous cycles then the ultrasonic sensor module 105 outputs to the controller 107 the value it has determined as a valid distance of the ground for that cycle. If the ground distance determined by the ultrasonic sensor module 107 for the current cycle is not within the acceptable deviation from the moving average distance value determined from the previous cycles then the ultrasonic sensor module outputs to the controller 107 a "no reading" error value for the ground distance value.

If the sensor is not able to determine the top of crop distance and/or ground distance, no information is incorporated into the moving average of the top of crop distance and ground distance calculated for future transmit and receive cycles.

The skilled person will thus appreciate that, for each transmit and receive cycle, each individual ultrasonic sensor module 105 outputs to the controller unit 107 either a local top of crop distance value or a "no reading" error value for top of crop distance and a local ground distance value or "no reading" error value for ground distance value.

For each transmit and receive cycle, when the control circuit 307 in an individual ultrasonic sensor module 105 generates an acceptable/valid value for the top of the crop distance and also an acceptable/valid value for the ground distance value, in the manner described above, the control circuit 307 also calculates a local crop height value by subtracting the top of crop distance value for that cycle from the ground distance value for that cycle. If the control circuit 307 calculates a local crop height then it transmits this, together with the local top of crop distance value and the local ground distance value, to the controller unit 107.

In the example described with reference to FIGS. 4, 5*a*, and 5*b* the local crop height value calculated in this way would be 0.95 m (1.45 m for the ground distance minus 0.5 m for the top of crop distance). This local crop height value is output to the controller 107 for each cycle where it can be calculated (obviously, if an error reading is reported for either the top of crop distance or ground distance value, or both, because the determined values do not fall within an acceptable deviation from the respective moving average values then there will be no crop height value calculated for that cycle and a "no reading" value provided to the controller 107 instead for the local crop height reading and at least one of the top of crop distance value or ground distance value).

The controller unit 107 continuously receives transmitted data from each of the individual ultrasonic sensor modules 105 and can record into its memory the transmitted data from each of the individual ultrasonic sensor modules 105 consisting of the individual top of crop distance values, ground distance values, and local crop height values, where available. The amount of data that the controller unit 107 is able to store depends on the size of the memory storage within the controller unit but, in the preferred embodiment, the controller unit 107 is able to store several minute's worth of data received from the ultrasonic sensor modules 105 before memory capacity is exceeded. If the memory of the controller unit 107 is exceeded then the controller unit 107 is configured to overwrite the oldest data in the memory with incoming new data.

When the user has set the controller unit 107 to record the data being received from the ultrasonic sensor modules 105 into its memory, any local crop height value received from each one of the ultrasonic sensor modules after each transmit and receive cycle is stored to the memory in the controller unit 107. Any "no reading" error values produced by any of the ultrasonic sensor modules 105 are not recorded into the memory buffer of the controller unit 107.

The skilled person will thus appreciate that the memory in the controller unit 107 stores all the previously transmitted local crop height values produced by the ultrasonic sensor modules over previous transmit and receive cycles. The controller unit 107 calculates a "virtual" crop height value which is the cumulative moving average of all of the previous local crop height values stored in the memory of the controller unit 107. The current cumulative moving average value of all of the local crop height values currently stored in the memory of the controller unit 107 is calculated at each transmit and receive cycle. After each transmit and receive cycle, when any newly transmitted local crop height values have been transmitted to the controller unit 107 from the individual ultrasonic sensor modules 105, the cumulative moving average value of the virtual crop height is updated to take account of the new local crop heights which have been received and stored.

The skilled person will appreciate that there are a number of ways in which the cumulative moving average can be calculated by the controller unit 107. In a more intensive approach, at each transmit and receive cycle, the controller unit 107 may simply sum every single local crop height value in its memory and divide the sum by the number of local crop height values in its memory. This approach is obviously computationally heavy and rather than calculate the cumulative moving average anew at each transmit and receive cycle, the controller unit 107 may simply calculate the cumulative moving average once and then update the cumulative moving average with the new values of local crop height received at each cycle using the following formula:

$$CA_{i+1} = \frac{h_{i+1} + iCA_i}{i+1}$$

where $CA_{i+1}$ is the new cumulative moving average, $CA_i$ is the previous value of the cumulative moving average, i is the number of values of local crop height stored in the memory, and $h_{i+1}$ is a new value of local crop height. Thus the skilled person will see that the cumulative moving average can be updated as each new local crop height value in a current transmit and receive cycle is received in a manner which is computationally less intensive than using the more intensive averaging method.

The skilled person will appreciate that by obtaining the local crop height readings from a number of individual ultrasonic sensor modules and recording them over time, and then averaging them allows a more accurate crop height, which will in turn produce a more accurate virtual crop height.

The calculation of the virtual top of crop height or virtual ground level can be accomplished with controller unit 107 or control circuit 307 of each individual ultrasonic sensor. In embodiments where the ultrasonic sensor provides a virtual top of crop distance or virtual ground level, such parameters may be accompanied by an indication from control circuit 307 that the parameter is a virtual parameter. In such embodiments, the control circuit 307 will maintain a moving average of the local crop height. Then, when the sensor module is unable to measure one of an actual top of crop height or an actual ground level, the moving average of the local crop height can be used in conjunction with the other parameter (actual ground level or actual top of crop) to provide a calculated or virtual parameter to represent the missing measurement.

Embodiments of present invention are able to make use of the virtual crop height calculated in the manner described above to control the height of the boom or cutter bar (respectively) according to a number of different control methodologies. These control methodologies will be named "hybrid top of crop" controlled and "hybrid ground level" controlled.

Hybrid Top of Crop Controlled Mode

The hybrid top of crop controlled mode of operation is similar to known "conventional top of crop" controlled systems but is able to control the height of the boom even if no local top of crop distance value can be calculated. The system and method avoids misinterpreting ground return signals, caused by lack of crop under the sensors, as a top of crop reflection. In conventional top of crop controlled systems, not being able to ascertain a valid top of crop distance for whatever reason will mean that the boom control system will be inoperable until such time as a top of crop signal becomes available. In the worst case, if the system interprets the ground level reflection as being from the top of the crop (because the ground reflection will be the first pulse reflection received by the system) then a conventional top of crop controlled system will attempt to maintain separation of the boom from that incorrectly interpreted level. This will cause a lowering of the boom which may cause a collision with crop in the path of the boom.

In both the conventional top of crop controlled mode and the hybrid top of crop controlled mode of the present invention, whenever the controller unit 107 is able to calculate a local top of crop distance value c from the ultrasonic sensor modules 105 at each transmit and receive cycle, the controller unit 107 adjusts the height of the boom above the determined level of the top of the crop to maintain a predetermined separation distance s between the top of crop level and the ultrasonic sensor modules 105 (and consequently the boom 101 to which they are attached).

Figure 6:
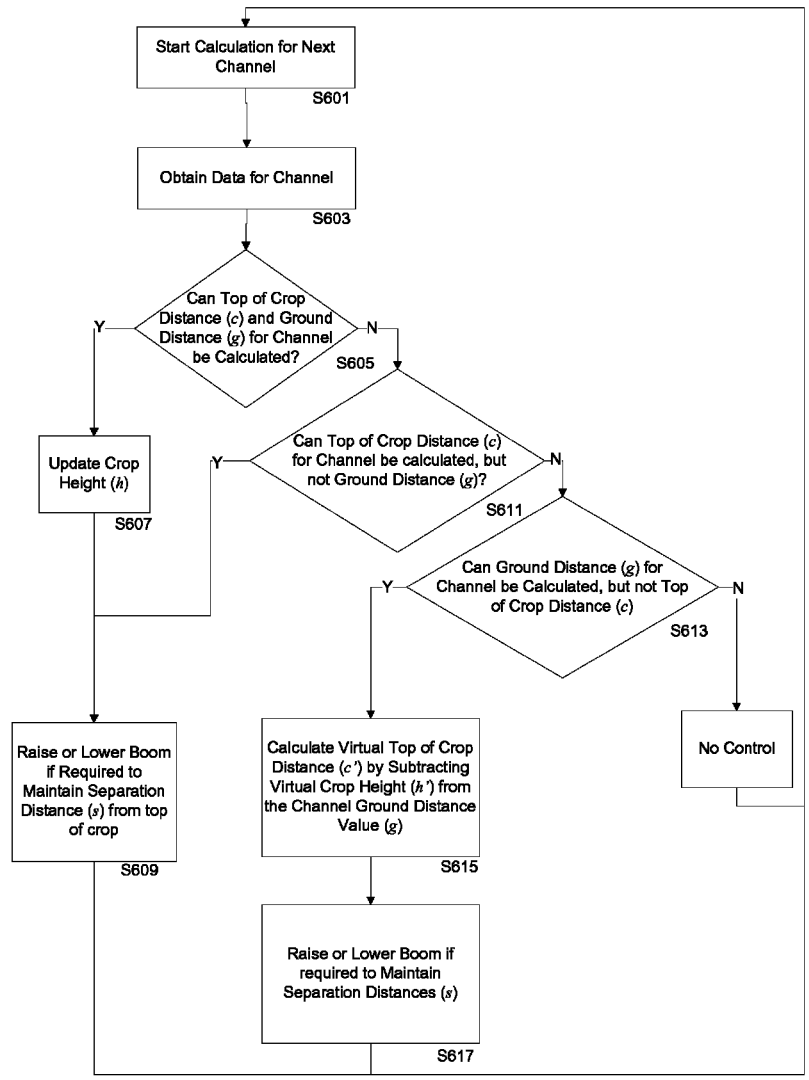
FIG. 6 shows a process flow chart of a first method of operation of an example in accordance with an embodiment of the present invention.

FIG. 6 is a process flow diagram illustrating the operation of the hybrid top of crop controlled mode in accordance with an embodiment of the present invention.

Calculations are performed for each channel (i.e. each section of the boom) as illustrated in step S601. As described in detail above, the ultrasonic sensor modules 105 each communicate their local top of crop distance c, local ground distance g, and local crop height value to the controller unit 107 for each channel. This is encapsulated in step S603 of the method in which crop data is obtained from the ultrasonic sensor modules to determine the crop data for each channel.

At step S605 of the hybrid top of crop controlled method, the controller unit 107 ascertains whether it has received valid values (i.e. no "no reading" error values) for both the local top of crop distance c and ground distance g from the ultrasonic sensor module(s) for that channel. If it has, then the method proceeds to step S607 where the controller 107 updates the virtual crop height value using the height information from the sensor(s) of the channel. The controller 107 will then proceed to step S609 where the controller 107 adjusts the boom height of the channel to maintain a set separation distance s between the boom and the top of crop as determined from the instantaneous local top of crop distance value.

If at S605 the controller does not receive both a valid crop and soil distance value for that channel, the controller unit 107 will proceed to S611 where it will determine if it has a valid top of crop distance c but does not have a valid ground distance g. If it has a valid top of crop distance c, then the method will proceed to step S609 where controller 107 adjusts the boom to maintain a set separation distance s to the top of crop as previously described. However, if at S611 controller 107 determines it is not able to determine the top of crop distance, it proceeds to step S613. If at this step the controller 107 determines neither the top of crop distance nor the ground distance can be measured, no control can occur. However if it determines that at S613 a valid ground distance, measurement can be obtained but not a valid top of crop distance the method will proceed to step S615 in which the controller unit 107 determines a virtual top of crop distance c'. It does this by subtracting the virtual crop height value (which it has calculated by determining the cumulative moving average of the individual local crop height values of previous transmit and receive cycles recorded in the memory of the controller unit 107) from the instantaneous ground distance value g for that particular transmit and receive cycle of that channel.

At step S617, the controller 107 controls the height of the boom to maintain a predetermined separation distance s between the boom and the top of the crop where the distance of the top of the crop is determined by the virtual top of crop distance rather than a real top of crop level determined from a reflected signal.

A new virtual top of crop level value will be calculated for each transmit and receive cycle for which there is no actual crop underneath the ultrasonic sensor module (i.e. whenever the controller unit 107 is unable to calculate an instantaneous top of crop distance value).

The memory in the controller unit 107 used to hold the local crop height values previously transmitted by the ultrasonic sensor modules 105 will not be updated with any further local crop height values until a valid top of crop distance reading (and hence also a local crop height value) is actually received at the controller unit 107 from any one of the ultrasonic sensor modules 105. Thus the virtual crop height value used to determine the virtual top of crop level will remain unchanged. Consequently, the height of the boom which is some offset from this virtual top of crop level will also remain fixed. Hence the only variable which will cause the boom to be moved up or down whenever the controller unit 107 is not receiving any valid local top of crop distance values (and hence also any local crop height values) from the ultrasonic sensor modules 105 would be a change in the determined instantaneous ground distance value g.

The skilled person will appreciate however that when the boom and the ultrasonic sensor modules 105 thereon travel from an area having continuous crop cover to a barren patch having no crop, the ultrasonic sensor modules 105 will not generate valid top of crop distance values during the first transmit and receive cycle occurring after the transition to the barren patch. This is because the new top of crop distance value determined by each of the ultrasonic sensor modules will not fall within the acceptable deviation from the previous local top of crop distance value that each sensor determined in the previous transmit and receive cycle.

Figure 7:
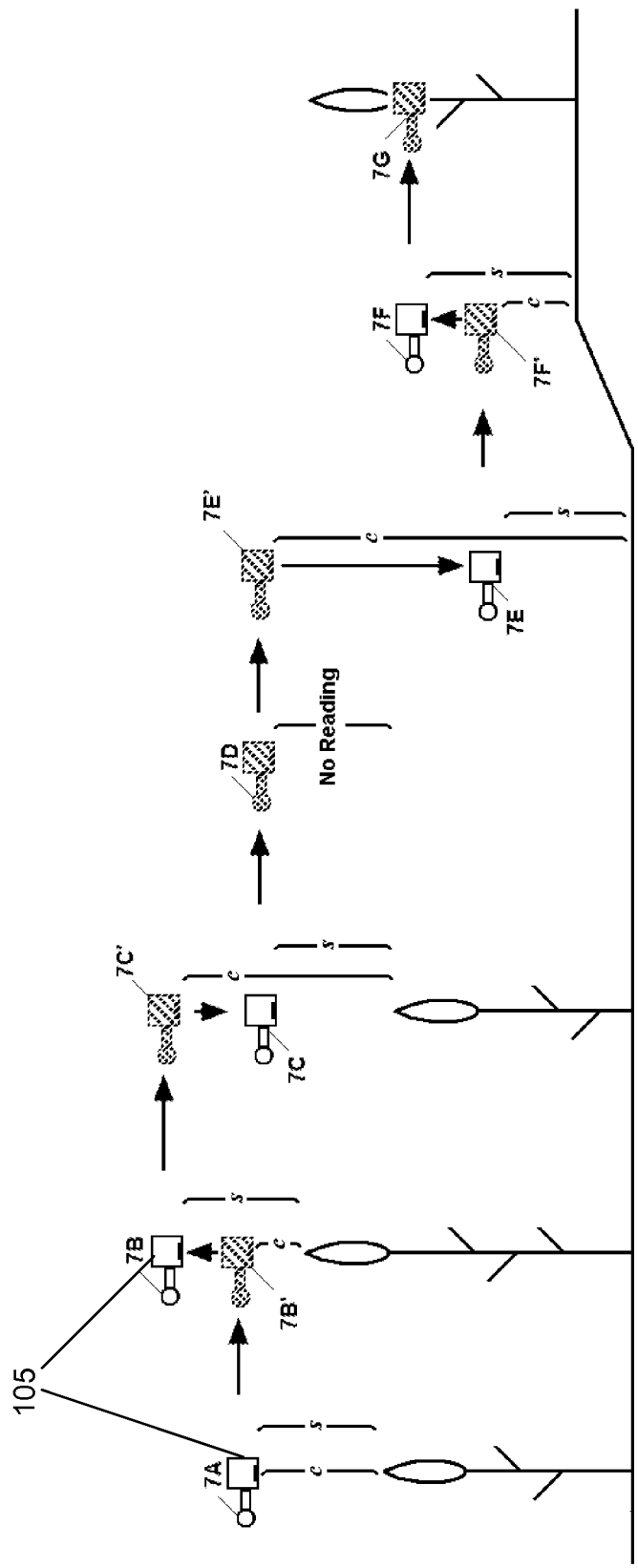
FIGS. 7 and 8 illustrate the operation of the first method of operation of the example in accordance with an embodiment of the present invention.
Figure 8:
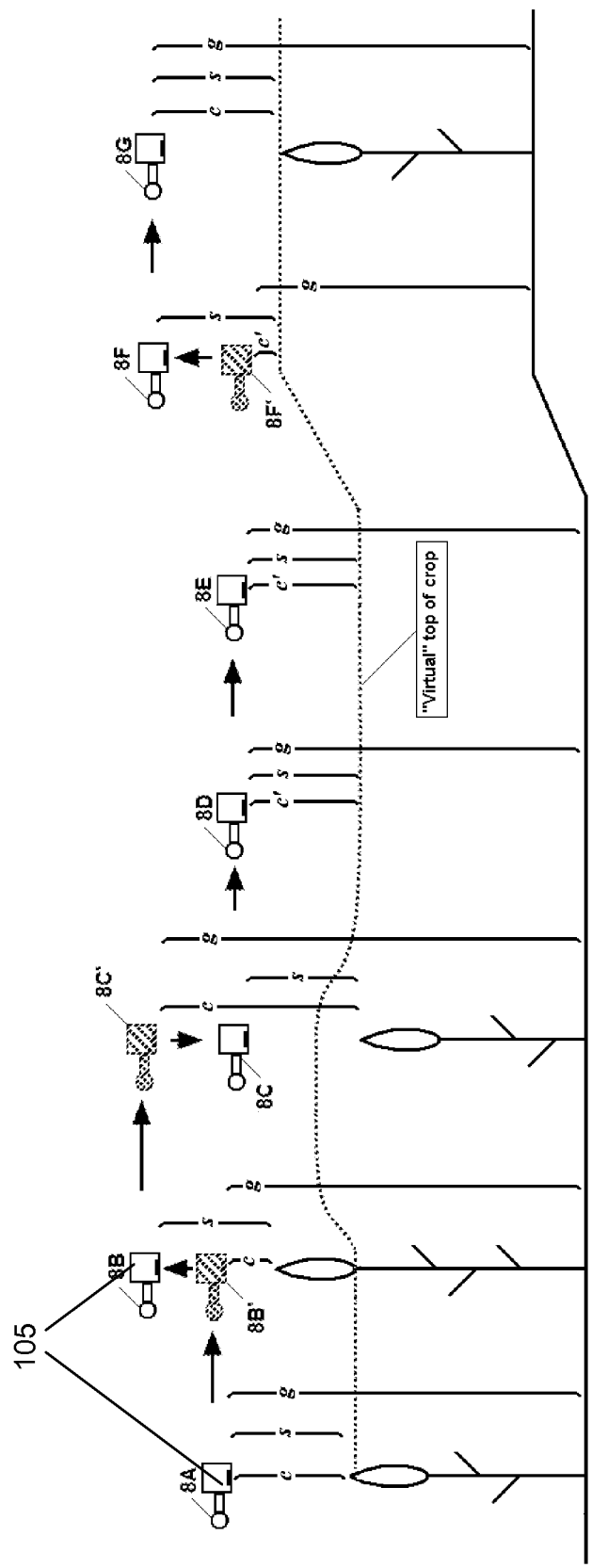

The operation of the hybrid top of crop controlled system of the example of present invention will now be further illustrated with reference to an exemplary field of crop, and will be compared to the operation of conventional "top of crop" mode of operation. In FIG. 7, a field of crop is shown and the position of the boom (and ultrasonic sensor modules 105 on said boom) as controlled according to the conventional "top of crop" mode of operation is illustrated. FIG. 8 illustrates the equivalent position of the boom over the crop if it were being controlled according to the hybrid top of crop driven method of operation of the example of an embodiment of the present invention. Both figures illustrate the equivalent position of the boom as the boom moves from left to right over the crop.

In both FIG. 7 at position 7A and FIG. 8 at position 8A, the controller units in both systems receive local top of crop distance values c from the ultrasonic sensors. In addition, the controller unit 107 of the system of embodiments of the present invention also receives local ground distance g values from the ultrasonic sensors 105. Both systems control the boom so that it maintains a predetermined separation distance s from the top of the crop.

In addition, the controller unit 107 of the embodiments of the present invention also receives a local crop height from any of the ultrasonic sensors 105 that are able to determine one. The controller 107 of embodiments of the present invention records the received local crop height values into memory and calculates the updated cumulative moving average for the "virtual" crop height (as shown by the dashed line in FIG. 8) ready for use in the next transmit and receive cycle.

As the boom of the conventional top of crop and the hybrid top of crop system moves to position 7B' and 8B', respectively, the new crop underneath the ultrasonic sensor modules 105 is taller than the previous crop at position 7A and 8A. Again both of the systems obtain a signal from the top of the crop and ascertain an instantaneous top of the crop distance c. At this position, because the crop is higher than the previous crop, the distance between the boom and the top of the crop is less than the predetermined separation distance s and so the controller unit 107 of both the conventional top of crop and the hybrid top of crop system will raise the boom to position 7B and 8B, respectively, to maintain the separation distance s between the boom and the top of crop. As before, the system of embodiments of the present invention also receives local ground distance g from the ultrasonic sensor modules 105 for that transmit and receive cycle. The controller 107 also records the local crop height values received from the ultrasonic sensor modules 105 into its memory and updates the cumulative moving average of the stored local crop heights to give the "virtual" crop height for use in the next transmit and receive cycle.

As the boom of the conventional top of crop system moves to position 7C', the new crop underneath it is shorter than the previous crop at position 7B. Similarly as the boom of the hybrid top of crop system in FIG. 8 moves to position 8C', the new crop underneath is shorter than the previous crop at position 8B. Again both of the systems obtain a signal from the top of the crop and ascertain a top of crop distance c from the local top of crop distance values received from the ultrasonic sensor modules 105. At this position, because the crop height is less than the previous crop, the distance between the boom and the top of the crop is larger than the predetermined separation distance s and so the controller unit 107 lowers the boom to position 7C and 8C (for the conventional top of crop system and the "hybrid top of crop system", respectively) so that the separation distance s is again maintained.

The skilled person will appreciate that FIGS. 7 and 8 shows only a few positions for the sake of clarity—in reality there would not be a large adjustment of the boom between positions because the height control system adjusts the boom height at each transmit and receive cycle. Because there are many of these per second, the movement of the boom would not be abrupt and discontinuous but would appear smooth. When travelling between position 7B and 7C, for example, the boom would appear to track the contour of the crop canopy smoothly.

At position 8C', as before, the controller unit 107 of the present invention determines an instantaneous ground level distance g from the individual local ground distance values received from the ultrasonic sensor modules 105. It also records the latest local crop height values received from the ultrasonic sensors 105 into its memory and updates the cumulative moving average of the local crop heights stored in its memory to provide an updated virtual crop height value for use in the next transmit and receive cycle.

As each boom of the conventional top of crop and the hybrid top of crop system moves to position 7D and 8D, respectively, it passes over an area in which there is no crop under any of the ultrasonic sensor modules. In this case, both control systems receive a reflection of the ultrasonic pulse from the ground level only.

In the conventional "top of crop" level driven control system, the reflection from the ground, because it is the first reflection received by the ultrasonic sensor modules 105, is interpreted as the top of crop signal and hence the local top of crop distance c at the ultrasonic sensor module will be incorrectly interpreted as equal to the ground distance. Because this change in top of crop distance determined at each ultrasonic sensor is quite large compared to the previous top of crop distance determined for the previous transmit and receive cycle, one type of control logic may cause the ultrasonic sensor modules 105 to generate and send a "No Reading" value of top of crop distance to the controller unit because the new height determined for the top of crop level is outside of the acceptable deviation from the top of crop distance determined at position 7C'. If the controller unit only receives "No Reading" errors from the ultrasonic sensors then it will become incapable of controlling the height of the boom because it does not know the distance of the top of the crop from the boom for that transmit and receive cycle and will not respond to changes in terrain. This is illustrated in position 7D of FIG. 7, where during this time no height control of the boom is possible.

Alternatively, if the ultrasonic sensors in a conventional top of crop controlled system use a different type of control logic which simply transmit the local top of crop distances which they have measured to the controller unit, and these values are actually the distance to the ground (because they have misinterpreted the reflection from the ground as the reflection from the top of crop as shown at position 7E' in FIG. 7) then the controller unit will interpret an instantaneous top of crop distance value which is actually the ground distance. The controller will then lower the boom from position 7E' to position 7E to maintain the separation distance s from the determined top of crop level (only it will actually be maintaining separation distance s from the ground level). As the boom shown in FIG. 7 moves from 7E to 7F', the distance measured to the ground decreases and the boom is raised to maintain separation distance s from the ground level.

The skilled person will appreciate that because the boom is lowered to maintain separation distance from a level which is actually the ground level rather than the top of crop level the boom may potentially impact the next crop in the boom's path, as illustrated in position 7G of FIG. 7.

In contrast, the hybrid top of crop controlled method and system of embodiments of the present invention will not suffer from these problems. As the boom shown in FIG. 8 moves from position 8C to position 8D, the ultrasonic sensor modules 105 correctly interpret the reflections from the ground as being from the ground (because they are the reflections having the furthest distance from the ultrasonic sensor modules and, moreover, are within an acceptable deviation from the previously determined local ground level distances determined when the boom was at position 8C).

The controller unit 107 receives from the ultrasonic sensor modules local values for the ground distance g but receives "no reading" values for the top of crop distance value c nor a local crop height value. However, the controller 107 does have a virtual crop height value calculated from the local crop heights stored in its memory from previous transmit and receive cycles.

When the controller unit 107 determines that it does not receive any local crop height data, it instead determines a virtual top of crop distance by subtracting the virtual crop height value from the local ground distance value g determined at position 8D. The controller 107 then maintains the separation distance s from that calculated virtual top of crop distance.

Similarly, as the boom of the hybrid top of crop controlled method moves from position 8D to 8E, although local ground distances g will be supplied to the controller 107 from the ultrasonic sensor modules 105 no local top of crop distances or local crop height values will be supplied to the controller unit 107. Hence the controller unit 107 will again calculate a virtual top of crop distance at position 8E, based on subtracting the virtual crop height (which, because the controller unit has not updated its memory with any further local crop height values, will be the same as that determined at position 8D) from the local ground distance value g.

At position 8F' although no local crop distance is available, the boom will be raised to position 8F to maintain the predetermined separation distance s from the virtual top of crop because the instantaneous ground distance g has changed.

In the system of embodiments of the present invention, as the boom moves to position 8G, the ultrasonic sensor modules 105 will receive a true echo from the top of the crop again and will send to the controller unit 107 local values of top of crop distance, ground distance, and crop height. The controller unit 107 will thus calculate both a top of crop distance and a ground distance value from the data supplied by the ultrasonic sensors 105 for that "transmit and receive" cycle. The controller unit 107 will thus once again raise or lower the boom to maintain the separation distance s between the boom and the top of the crop but this time the top of crop distance will be used for the top of crop level because it is available.

Clearly, using the hybrid top of crop controlled mode of operation, the controller unit is able to maintain height control of the boom even if top of crop distance values are not received from the ultrasonic sensor modules. In addition, there is no risk of the boom being lowered into the path of oncoming crops as the boom moves between positions 8C and 8G.

The skilled person will thus appreciate that by operating in the hybrid top of crop controlled mode, the height control system and method of the present invention allows the tractor and boom to traverse patchy areas of crop where normal "top of crop" level driven height control systems would potentially become inoperable or cause the boom to be lowered into the path of oncoming crop if the boom passed over an area free from crop.

Hybrid Ground Level Controlled Mode

In both the known "conventional ground level" controlled mode and the "hybrid ground level" controlled mode of the example of present invention the controller unit 107 is used to adjust the height of a cutter bar above the determined level of the ground to maintain a predetermined separation distance S between the ground level and the cutter bar.

Figure 9:
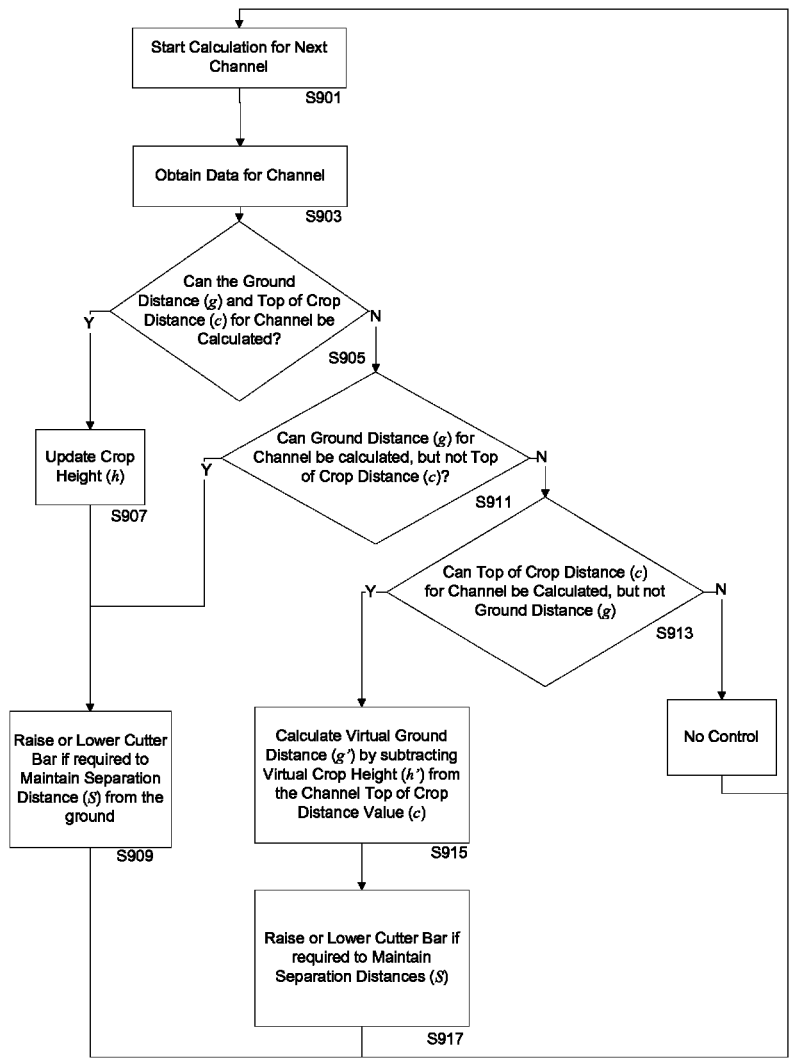
FIG. 9 shows a process flow chart of a second method of operation of an example in accordance with an embodiment of the present invention.

FIG. 9 is a process flow diagram illustrating the operation of the hybrid ground level controlled mode of the present invention.

Calculations are performed for each channel as illustrated in step S901. As described in detail above, each ultrasonic sensor module 105 communicates its local ground level distance g, local top of crop distance c, and local crop height value to the controller unit 107 for each channel. This is encapsulated in step S903 of the method in which crop data is obtained from the ultrasonic sensor modules 105 to determine the crop data for each channel.

The skilled person will appreciate however that when the cutter bar and the ultrasonic sensor modules 105 thereon travel to an area in which an echo from the true ground level cannot be obtained, the ultrasonic sensor modules 105 will not generate valid ground distance values during the first transmit and receive cycle occurring after the transition to that area. This is because the furthest echo received by the ultrasonic sensor modules would not be received from the true ground level but some object closer to the ultrasonic sensor modules than the ground level, such as a part of the crop, perhaps. This would particularly be the case if crop had been laid or bent over. In conventional ground level controlled systems, the ultrasonic sensor modules would interpret the reflection from the top of the laid over crop as being from the true ground and so indicate an erroneous ground level.

At step S905 the controller unit 107 determines if it has received valid values (i.e. no "no reading" error signals) for both the ground distance g and top of crop distance c from the ultrasonic sensor module(s) 105 for that channel. If it has received both signals, it will proceed to S907 where the controller 107 updates the virtual crop height value using the height information, and then the controller will then proceed to S909 where it adjusts the position of the cutter bar to maintain a set separation distance S between the cutter bar and the ground. However, if at S905 the controller determines it has not received valid signals for both the ground distance and the top of crop distance it will proceed to S911 where it will then determine if it has a valid ground distance g but not a valid top of crop distance c. If at S911 the controller determines it has a valid ground distance g but not a valid top of crop distance c, it will proceed to S909 and control the position of the cutter bar to maintain separation distance S. However, if at S911 the controller 107 determines it is able to determine the top of crop distance but not able to determine the ground distance it proceeds to S913. If at S913 the controller 107 determines neither the ground distance g nor the top of crop distance c can be determined, no control can occur. However, if at S913 controller 107 determines a valid top of crop distance signal c can be obtained but not a valid ground distance g, the method will proceed to S915 in which the controller unit 107 determines a virtual ground distance g'. It does this by adding the virtual crop height value (which it has calculated by determining the cumulative moving average of the individual local crop height values of previous transmit and receive cycles recorded in the memory buffer of the controller 107) to the instantaneous top of crop distance value c for that particular transmit and receive cycle of that channel.

At step S917, the controller 107 will then control the height of the cutter bar to maintain a predetermined separation distance S between the cutter bar and the ground level where the distance of the ground is determined by the virtual ground distance rather than a real ground level determined from a reflected signal.

A new virtual ground distance will be calculated for each transmit and receive cycle for which the sensor module 105 is unable to determine an instantaneous local ground distance value.

The memory in the controller unit 107 used to hold the local crop height values previously transmitted by the ultrasonic sensor modules 105 will not be updated with any further local crop height values until a valid ground distance reading (and hence also a local crop height value) is actually received at the controller unit 107 from any one of the ultrasonic sensor modules 105. Thus the virtual crop height value used to determine the virtual ground distance will remain fixed. Consequently, the height of the cutter bar which is some offset from this virtual ground level will also remain fixed. Hence the only variable which will cause the cutter bar to be moved up or down whenever the controller unit 107 is not receiving any ground distance values (and hence also any crop height values) from the ultrasonic sensor modules 105 would be a change in the determined instantaneous top of crop distance value c.

Figure 10:
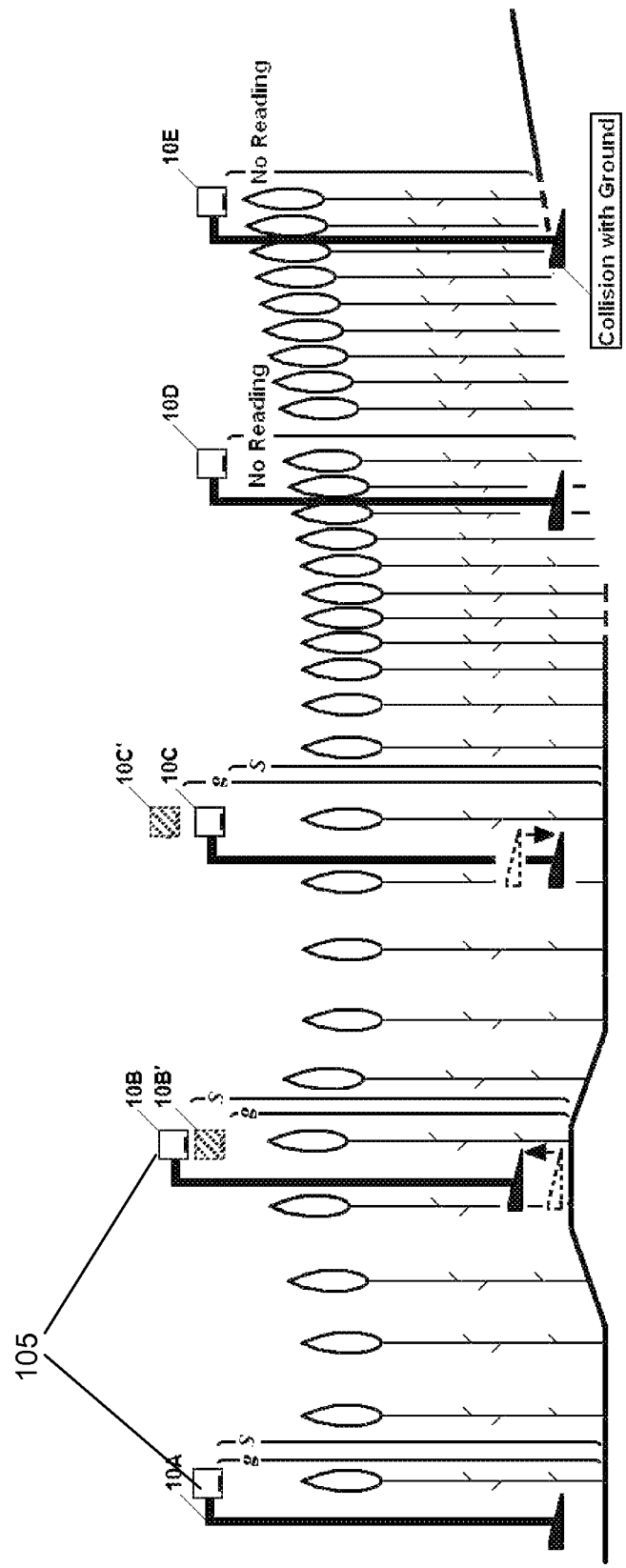
FIGS. 10 and 11 illustrate the operation of the second method of the example in accordance with an embodiment of the present invention.
Figure 11:
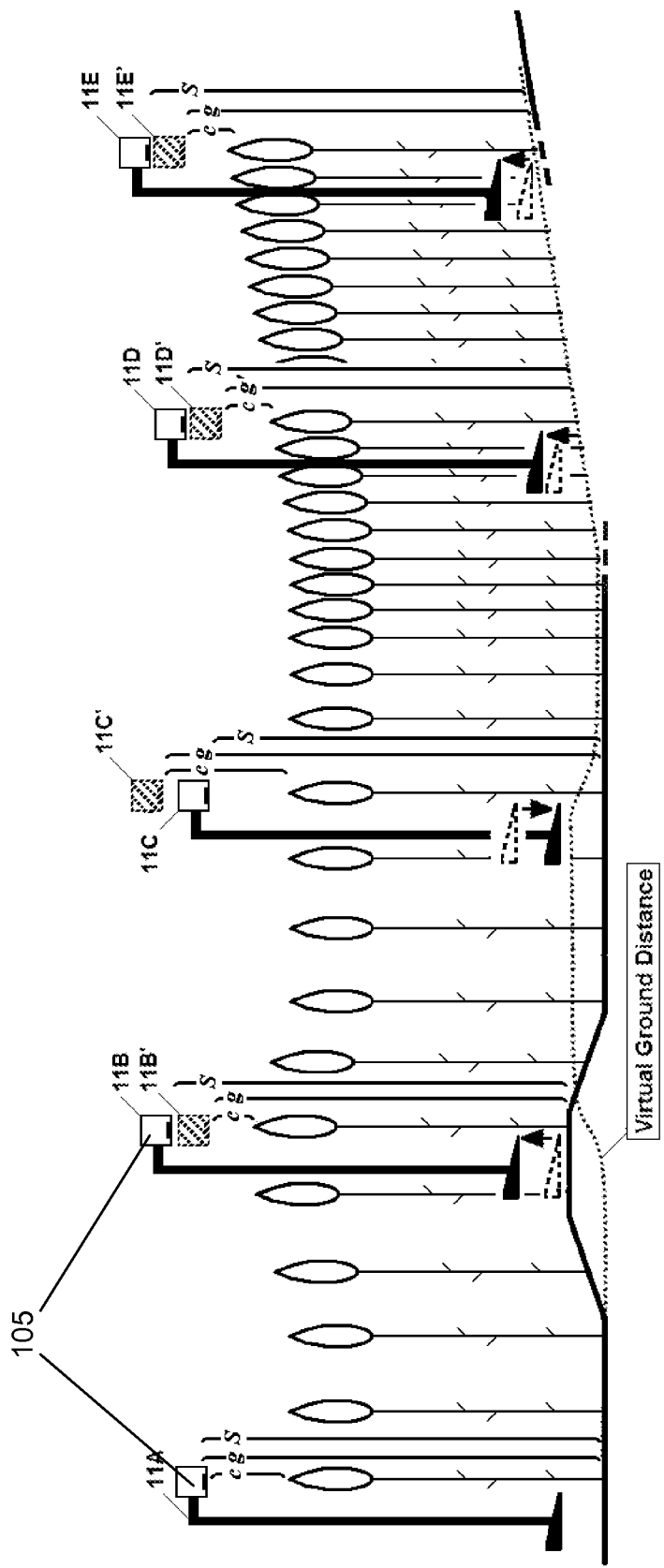

The operation of the hybrid ground level controlled system of the example of present invention will now be further illustrated with reference to an exemplary field of crop, and will be compared to the operation of conventional "ground level" mode of operation. In FIG. 10, a field of crop is shown and the position of the cutter bar as controlled by the conventional ground level mode of operation is illustrated. FIG. 11 illustrates the equivalent position of the cutter bar over the ground if it were being controlled with hybrid ground level controlled mode of operation of an example of an embodiment of the present invention. Both Figures illustrate the equivalent position of the cutter bar as the cutter bar moves left to right through the crop.

In both FIG. 10 at position 10A and FIG. 11 at 11A, the controller units in both systems receive local ground distance values g from the ultrasonic sensors. In addition, the controller unit 107 of the system of an embodiment of the present invention also receives local top of crop distance values c from the ultrasonic sensors 105. Both systems control the cutter bar so that it is a set distance S from the ground level. However, in FIGS. 10 and 11 the distance g is illustrated as the distance to the ground from the sensor module 105 and not from the cutter bar for clarity, but the skilled person will realize that the difference in these two points of reference is a fixed offset in distance.

In addition, the controller unit 107 of embodiments of the present invention also receives a local crop height from any of the ultrasonic sensors 105 that are able to determine one. The controller 107 records the received local crop height values into memory and calculates the updated cumulative moving average for the virtual crop height ready for use in the next transmit and receive cycle (as shown by the dashed line in FIG. 11).

As the cutter bar of the conventional ground level and the hybrid ground level system move to position 10B' and 11B', respectively, the ground level underneath the cutter bar and ultrasonic sensor modules 105 becomes higher than the ground level at previous position 10A and 11A. Again both of the systems obtain a true reflection from the ground and ascertain an instantaneous ground distance value g. At this position, because the distance between the cutter bar and the ground level is less than the predetermined separation distance S, the controller unit 107 of both the conventional ground level and the hybrid ground level system will raise the cutter bar up to position to 10B and 11B for FIGS. 10 and 11 respectively to maintain the separation distance, S, between cutter bar and ground. As before, the system of the present invention also determines an instantaneous local top of crop distance c from the individual local top of crop distance values received from the ultrasonic sensor modules 105 for that transmit and receive cycle. The controller 107 records the local crop height values received from the ultrasonic sensor modules 105 in its memory and updates the cumulative moving average of the stored local crop heights to give the virtual crop height for use in the next transmit and receive cycle.

As the cutter bar of the conventional ground level system illustrated in FIG. 10 moves from 10B to position 10C', the ground level drops away so that it is lower than the ground level at position 10B. Similarly as the cutter bar of the hybrid ground level system in FIG. 11 moves to position 11C', the ground level drops away so that it is lower than the ground level at position 11B. Again both of the systems obtain a true reflection from the ground level and ascertain an instantaneous ground distance value from the individual local ground distance values received from the ultrasonic sensor modules 105. At this position, because the distance to the ground level is larger than the predetermined separation distance S the controller unit 107 lowers the cutter bar to position 10C and 11C (for the conventional ground level system and the "hybrid ground system" respectively) so that the separation distance, S, is again maintained.

The skilled person will appreciate that FIGS. 10 and 11 show only a few positions for the sake of clarity—in reality there would not be a large adjustment of the cutter bar between positions because the height control system adjusts the cutter bar height at each transmit and receive cycle. Because there are many of these per second, the movement of the cutter bar would not be abrupt and discontinuous but would appear smooth. When travelling between position 10B and 100, for example, the cutter bar would appear to track the contour of the ground level smoothly.

At position 11C', as before, the controller unit 107 of the present invention also determines an instantaneous local top of crop distance c from the individual top of crop distance values received from the ultrasonic sensor modules 105 for that transmit and receive cycle. The controller 107 records the latest local crop height values received from the ultrasonic sensors 105 into its memory and updates the cumulative moving average of the local crop heights stored in its memory to provide an updated virtual crop height value for use in the next transmit and receive cycle.

As the cutter bar of the conventional ground level mode system moves to position 10D in FIG. 10, it might pass over an area in which the crop has a very thick canopy which blocks the sensor(s) view of the ground. The top of the crop would be well above the actual ground level. Due to the abrupt rise in the detected ground level (the ultrasonic sensor modules 105 would see the top of the crop as a false ground level) the ground distance that each of the ultrasonic sensor modules measured would likely be much smaller than the previously measured local ground distance value and thus outside of the acceptable deviation from the previous locally measured ground distance in which case the ultrasonic sensor modules would return a "no reading" value for the local ground distance value. Alternatively, if a ditch or rut in the ground was present at position 10D thus causing the locally measured ground distances to be much greater than the previously recorded ground distances, an ultrasonic sensor module would report a "no reading" error for local ground distance value.

If the ground distance measured (which is actually the measurement to the top of crop) is within the acceptable deviation from the previous local measured ground distance, or if the controller logic does not check the latest reading against the previously recorded ground distance, it is also possible that the controller will raise the cutter bar to maintain separation distance S between the sensor and top of crop rather than the ground.

In the conventional ground level driven control system, if the controller unit only receives "no reading" errors from the ultrasonic sensor modules for the local ground distance values then it will become incapable of controlling the height of the cutter bar because it does not know the distance of the ground from the cutter bar for that transmit and receive cycle. Typically, when this situation occurs the height control system has to be manually managed until such time as a reliable ground level can be determined. As illustrated in FIG. 10, without manual intervention the cutter bar will make contact with the ground at position 10E.

In contrast, the hybrid ground level controlled method and system of the present invention does not suffer from this problem and control of the cutter bar height is always maintained by the controller unit 107. Illustrated in FIG. 11, as the cutter bar moves from position 11C to position 11D', the controller unit 107 receives from the ultrasonic sensor modules local values for the top of crop distances c but receives "no reading" values for the local ground distance values and also for the local crop height values. However, the controller unit 107 does have a virtual crop height value calculated from the local ground and top of crop distance measurements stored in its memory from previous transmit and receive cycles.

When the controller unit 107 determines that it cannot calculate an instantaneous local ground distance value, it instead determines a virtual ground distance, illustrated in FIG. 11 as a dotted line, by adding the virtual crop height value to the instantaneous local top of crop distance value determined at position 11C. The controller 107 then maintains the separation distance S from that calculated virtual ground distance.

For each subsequent transmit and receive cycle that the controller unit 107 is unable to calculate an instantaneous local ground distance it will again calculate a virtual ground distance based on adding the virtual crop height (which, because the controller unit 107 has not updated its memory with any further local crop height values, will be the same as that determined at position 11C') to the instantaneous local top of crop distance value (which might be the most recent successfully calculated instantaneous top of crop distance value if "no reading" values have been received at a given position).

In an embodiment of the present invention, when the cutter bar moves to a position where the ultrasonic sensor modules are able to determine a local ground distance which is within an acceptable deviation of the last acceptable local ground distance value transmitted to the controller unit 107 the sensor module 105 will once again begin transmitting local ground distance values to the controller unit 107 rather than "no reading" values. The controller unit 107 will thus once again raise or lower the cutter bar to maintain the separation distance S between the cutter bar and the ground level albeit that the instantaneous local ground distance g will now be used rather than a virtual ground level because it is available. This is illustrated at position 11E in FIG. 11.

Clearly, using the hybrid ground level controlled mode of operation, the controller unit is able to maintain height control of the cutter bar even if no useable ground distance values are received from the ultrasonic sensor modules 105.

The skilled person will thus appreciate that by operating in the hybrid ground level controlled mode, the height control system and method of the present invention allows the cutter bar to traverse areas of crop where normal "ground level" driven height control systems would potentially become inoperable if they could not obtain a satisfactory indication of the ground level from the ultrasonic sensors.

Figure 12:
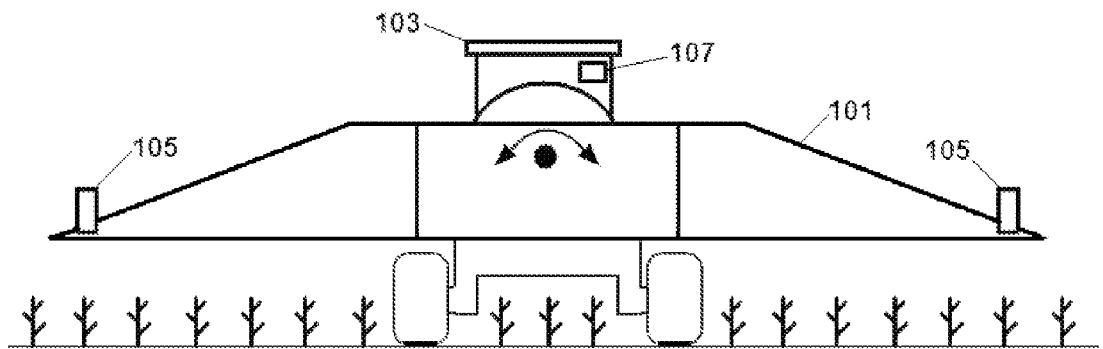
FIG. 12 illustrates an alternative example of a sprayer boom height control system in accordance with an embodiment of the present invention.

Modifications:

Whilst the preferred embodiment of the present invention has been described as being used with two separate VG sprayer booms each mounted on a side of the tractor unit for hybrid top of crop control mode, and described as being a harvester cutter bar for hybrid ground level control mode, the skilled person will appreciate that other arrangements could be contemplated within the scope of the present invention. Indeed, the ultrasonic sensor modules could be placed in any arrangement with respect to the booms 101. Furthermore, a single large sprayer boom could be used in the present invention rather than the two separate VG sprayer booms described. A single large sprayer boom would be mounted at its mid-point to the tractor unit and would be coupled to the tractor unit by well known coupling mechanisms which allow the boom to be rotated about its mid-point and also raised and lowered towards and away from the ground. The ultrasonic sensor modules 105 would be arranged along the length of the single sprayer boom. FIG. 12 illustrates such a tractor and boom arrangement.

Figure 13:
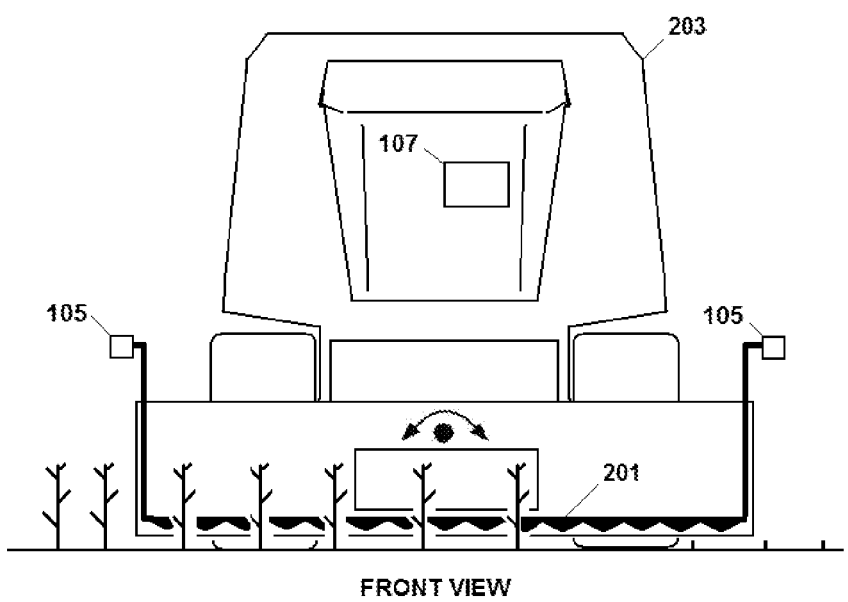
FIG. 13 illustrates an alternative example of a harvester cutter bar height control system in accordance with an embodiment of the present invention.

Similarly, an arrangement could be made to control the lateral inclination of a cutter bar by placing ultrasonic sensor modules on either side of the cutter bar as illustrated in FIG. 13. The cutter bar would be coupled to the harvester unit using well known coupling mechanisms not only to raise and lower the cutter bar but to be rotated about its midpoint.

Whilst the present method and system have been described with reference to using multiple ultrasonic sensor modules 105, the skilled person will appreciate that embodiments of the present invention could be equally well applied to a system having only a single ultrasonic sensor module. In such a case, the instantaneous representative crop height values calculated by the controller unit 107 would not be based on averaging the local values of the same from multiple ultrasonic sensor modules but would actually be the local values from the single ultrasonic sensor module. Such a system would still operate to record the local crop height values received by the controller unit 107 over time into its memory to form a virtual crop height value in the manner discussed above.

The skilled person will understand that, if receiving crop data from multiple ultrasonic sensor modules, other ways of interpreting the data (provided so that it could be used in the method of the present invention) could be considered. For example, a single ground distance value provided by any of the multiple ultrasonic sensor modules 105 could be considered by the controller 107 as the representative ground distance value for that particular transmit and receive cycle. Similarly, a single one of the top of crop distance values provided by any of the multiple ultrasonic sensor modules 105 could be considered by the controller 107 as the representative top of crop distance value for that particular transmit and receive cycle. A single one of the local crop height values supplied to the controller 107 for that particular transmit and receive cycle from all of the ultrasonic sensor modules 105 could be taken as the instantaneous representative crop height value for that cycle. The skilled person will appreciate that the criteria for selecting which single local value to take as the corresponding instantaneous representative value would depend on what mode of operation the system was in. For example, if in ground level controlled mode, the smallest individual local ground level distance might be selected as the instantaneous representative value as this would ensure that the separation distance was maintained from the nearest ground to any of the sensors.

The skilled person will appreciate that in the foregoing description, distances of the top of crop and the ground level have been determined from the ultrasonic sensor modules with increasing distance away from the sensor module having an increasing positive distance value. The skilled person will understand that it a different distance notation scheme is implemented (for example distances from the boom are given negative values say) then the virtual crop height, and virtual top of crop distance and virtual ground distance would be calculated using the different notion scheme.

The main embodiment of the invention describes opening a receive window for a preset period of time where the time chosen is sufficient to allow any reflections from the ground to reach the transducer. The skilled person will appreciate that the duration for which the receive window is opened could be automatically varied based on a range of factors such as the distance of the ground determined as part of the last transmit and receive cycle, plus some offset. This would mean that as the boom was moved closer to the ground, the receive window would be made shorter to reflect the fact that reflections will not take as long to reach the transducer whilst as the boom was moved further away from the ground the receive window would be increased. Alternatively, the duration for which the receive window is open could be varied manually and set by the operator of the system, via the controller 107. Manual setting may depend on crop type (because different crop types will have different heights), an average predetermined crop height, and the time of year (to reflect that crop being sprayed later in the growing season will generally be taller thus requiring the boom to be higher from the ground) and the controller 107 may present a suitable interface to the operator of the system to allow data regarding these variables to be input into the system and to set the receive window duration accordingly.

In the present embodiment the ultrasonic sensor modules 105 are described as transmitting an ultrasonic pulse at discrete intervals of 20 to 30 milliseconds. The skilled person will appreciate that the interval at which the ultrasonic pulses are transmitted could be varied. Such variation could depend on the type of crop over which the ultrasonic sensor modules will pass, the planting density or separation between plants of the crop over which the ultrasonic sensor modules will pass, the density of the individual plants over which the ultrasonic sensor modules will pass, the time of year at which the operation is being carried out (because if it is later in the growing season then crop will naturally be larger and foliage will be denser) and the speed at which the boom (and hence ultrasonic sensor modules) is passing over the crop. As the boom moves faster over the crops, for example, a shorter interval between pulse transmissions will be required.

In the preferred embodiment discussed above, it is mentioned that the gain of the receiving and amplifying circuit is increased in an exponential fashion with increasing elapsed time since pulse transmission. The skilled person will appreciate that the gain of the receive and amplify circuit could be increased using any suitable relationship rather than simply an exponential relationship over time. The skilled person will also appreciate that no increase in gain over time might also be applied.

The skilled person will appreciate that a wide range of sound pulse frequencies could be used in the present invention. Although ultrasonic sensor modules have been described, the skilled person will appreciate that the sound generation and detection equipment of the present invention could be altered to produce and receive sound of any desired frequency.

Moreover, whilst individual ultrasonic sensor modules have been described as both transmitting the ultrasonic pulse and detecting/receiving the resulting echoes, appropriate separate components could be used for each of these steps.

The skilled person will appreciate that rather than each ultrasonic sensor module calculating the crop height value from the local ground distance value and local top of crop distance value it measures, the ultrasonic sensor module(s) 105 may simply transmit the ground distance value and the top of crop distance value to the controller 107 which will carry out the calculation of local crop height for the readings from each sensor itself. In such a case, the controller unit 107 would still record each of the local crop height values it calculates into its memory to form the basis for calculating the cumulative moving average of the local crop heights.

The number of individual crop height values stored in the memory buffer of the controller 107 for previous cycles may vary in dependence on the type of crop, the time of year (there is likely to be more and larger barren patches in autumn/winter than spring or summer) at which the operation is being carried out, the age of the crop being sprayed, the density of planting of the crop, and the speed at which the ultrasonic sensors are travelling over the ground. In addition, the recording of local crop height values into the controller unit memory may be stopped and started by certain external triggers such as positional data (obtained from a global satellite positioning system or any other means) indicating that the tractor unit is at a desired location, or by a user operable control. Because the local crop height values recorded into the controller's memory form the basis for the cumulative moving average of crop height (i.e. the virtual crop height which drives the present system), providing control over when local crop heights are recorded into the memory of the controller unit 107 allows the user to ensure that the virtual crop height value being calculated is very accurate and relevant to the crop which is actually of interest. If the tractor has to transit to a target field of crop, then it is undesirable for any local values of crop height produced by the ultrasonic sensor modules along the way to the target field to be included in the cumulative moving average value and thus contribute to the virtual crop height value. Using positional data or a manual intervention by the user of the system to begin recording local crop height values from the ultrasonic sensor modules into the controller unit memory allows only relevant local crop heights to be recorded to the memory.

In addition, in a system which incorporates multiple ultrasonic sensors, the skilled person will appreciate that the controller unit 107 could be controlled to ignore the readings of local ground distance, local top of crop distance, and local crop height from certain ones of the ultrasonic sensor modules. In this way, certain ultrasonic sensor modules 105 could be "masked" so that their data is not included in any calculations carried out by the controller unit 107.

Although the height control system and method of the present invention has been described with reference to controlling the height of a sprayer boom which is towed behind a tractor, the skilled person will appreciate that the height control system of the present invention could be applied to any equipment requiring height control. Another example to which the height control system and method of the present invention could be applied includes, but is not limited to controlling the height of a cutting blade of a combine-harvester or to tillaging mechanisms where height control is required.

What is claimed is:

1. A method of controlling a height of an agricultural equipment component comprising:
    determining an average crop height:
    when a current top of crop level can be determined, adjusting the height of the agricultural equipment component to maintain the agricultural equipment component a predetermined distance from the current top of crop level; and
    when a current top of crop level cannot be determined:
        calculating a virtual top of crop level using said average crop height; and
        adjusting the height of the agricultural equipment component to maintain the agricultural equipment component the predetermined distance from said virtual top of crop level.

2. The method of claim 1, wherein said virtual top of crop level is calculated by subtracting said average crop height from a current ground level.

3. The method of claim 1, wherein when the current top of crop level can be determined, the current top of crop level is determined by:
    transmitting an ultrasonic pulse;
    detecting a return echo of said pulse and characterising said return echo as a return echo from a top of a crop together with the time at which the return echo is received;
    using the known speed of the transmitted pulse and the time elapsed between the transmission of the pulse and the time of receipt of the return echo to calculate a distance representing the current top of crop level.

4. The method of claim 3, and further comprising:
    measuring ambient air temperature when transmitting the ultrasonic pulse and using the ambient air temperature measurement to determine a corrected speed of the ultrasonic pulse corrected for temperature, and using the corrected speed as the known speed.

5. The method of claim 1, wherein the average crop height comprises an average of historical crop heights.

6. The method of claim 5, wherein said historical crop heights are individual crop heights which have been determined by an ultrasonic sensor by subtracting an instantaneous distance of a top of crop detected under the ultrasonic sensor from an instantaneous ground distance which was also detected under the ultrasonic sensor at the same time.

7. The method of claim 1, wherein the average crop height is preset by a user.

8. The method of claim 1, wherein said agricultural equipment comprises a sprayer boom.

9. The method of claim 1, wherein said agricultural equipment comprises a cutter bar.

10. A method of controlling a height of an agricultural equipment component comprising:
    determining an average crop height:
    when a current ground level can be determined, adjusting the height of said agricultural equipment component to maintain a predetermined distance from said agricultural equipment component to the current ground level, and
    when a current ground level cannot be determined:
        calculating a virtual ground level using said average crop height; and
        controlling adjusting the height of said agricultural equipment component to maintain the predetermined distance from said agricultural equipment component to said virtual ground level.

11. The method of claim 10, wherein said virtual ground level is calculated by adding said average crop height to a current top of crop level.

12. The method of claim 10, wherein when the current ground level can be determined, the current ground level is determined by:
    transmitting an ultrasonic pulse;
    detecting a return echo of said pulse and characterising said return echo as a return from ground together with the time at which the return echo is received;
    using the known speed of the transmitted pulse and the time elapsed between the transmission of the pulse and the time of receipt of the return echo to calculate stance representing the current ground level.

13. The method of claim 12, and further comprising:
    measuring ambient air temperature at a time of transmission of the ultrasonic pulse, using the ambient air temperature measurement to determine the speed of the ultrasonic pulse corrected for temperature, and using the speed of the ultrasonic pulse corrected for temperature as the known speed.

14. The method of claim 10, wherein the average crop height comprises an average of historical crop heights.

15. The method of claim 14, wherein said historical crop heights are individual crop heights which have been determined by an ultrasonic sensor by subtracting an instantaneous distance of a top of crop detected under the ultrasonic sensor from an instantaneous ground distance which was also detected under the ultrasonic sensor at the same time.

16. The method of claim 10, wherein the average crop height is preset by a user.

17. The method of claim 10, wherein said agricultural equipment comprises a sprayer boom.

18. The method of claim 10, wherein said agricultural equipment comprises a cutter bar.

19. A system for controlling a height of an agricultural equipment component, the system comprising:
    a sensor configured to provide a signal; and;
    a control unit coupled to the sensor and configured to receive said signal,
        wherein when said signal is indicative of a current top of crop level and a current ground level, said control unit is configured to calculate an average crop height from said signal, store the average crop height in a memory and provide a control signal to control the height of the agricultural equipment component, and wherein, when said signal is indicative of one of the current top of crop level and the current ground level but is not indicative of both the current top of crop level and the current ground level, said control unit is further configured to:

calculate a virtual level, using an average crop height in the memory and said signal; and adjust said control signal to control the height of the agricultural equipment component to maintain a predetermined distance from said virtual level.

20. The system of claim 19, wherein said sensor is mounted on a sprayer boom.

21. The system of claim 19, wherein said sensor is mounted on a cutter bar.

22. An ultrasonic sensor for detecting object distances relative to an agricultural equipment component, the ultrasonic sensor comprising:

an ultrasonic transducer operable to transmit and receive ultrasonic sound waves;

a pulse generator coupled to the ultrasonic transducer;

an amplifying circuit coupled to the ultrasonic transducer;

a control circuit operably coupled to the pulse generator and the amplifying circuit, the control circuit being configured to cause the pulse generator to generate a pulse, and to receive at least one echo return through the amplifying circuit;

wherein the control circuit is further configured to analyze the at least one echo return to calculate an actual ground level, an actual top of crop level, and an average crop level based on a plurality of actual ground level measurements and actual top of crop level measurements; and wherein control circuit is further configured to provide a virtual level parameter when one of the actual ground level and the actual top of crop level cannot be measured, the virtual level being related to the average crop level and one of the actual ground level and the actual top of crop level that can be measured, the control circuit being further configured to provide the virtual level to a controller of the agricultural equipment component.

23. The sensor of claim 22, wherein the control circuit is configured to provide the virtual level over a Controller Area Network (CAN).

24. The sensor of claim 22, wherein the control circuit is further configured to provide an indication that the virtual level is a virtual parameter.

* * * * *